UNITED STATES PATENT OFFICE.

OSCAR JULIAN STEINHART AND JULIUS LEONARD FOX VOGEL, OF LONDON, ENGLAND, ASSIGNORS TO THE FOREIGN CHEMICAL AND ELECTROLYTIC SYNDICATE, LIMITED, OF SAME PLACE.

PROCESS OF PRODUCING BASIC LEAD CARBONATE.

SPECIFICATION forming part of Letters Patent No. 641,751, dated January 23, 1900.

Application filed May 21, 1896. Serial No. 592,504. (No specimens.)

*To all whom it may concern:*

Be it known that we, OSCAR JULIAN STEINHART, Ph. D., and JULIUS LEONARD FOX VOGEL, chemist, of 6 Clements lane, Lombard street, in the city of London, England, have invented a new and useful Improved Process of Producing Basic Lead Carbonate, of which the following is a full, clear, and exact description.

This invention relates to an improved process of producing basic lead carbonate by a cycle of operations wherein lead nitrate is formed and is then decomposed by sodium carbonate for the production of basic lead carbonate.

It is to be understood that wherever sodium carbonate and caustic soda are referred to potassium carbonate and caustic potash are included.

The special object of the present improved process is to obtain carbonate of lead as pure as possible and free from basic lead nitrate, whose presence would render the lead carbonate unfit for use as a pigment or for any other commercial purpose.

We may proceed as follows: Crude pig-lead is oxidized and the lead oxid thus obtained is dissolved in nitric acid to form lead nitrate. Any silver, copper, and other metallic impurities that may have been present in the crude lead are now eliminated from the lead nitrate by the addition of finely-divided metallic lead, whereby the silver and some other metallic impurities are precipitated along with the finely-divided lead, the precipitate forming ultimately rich silver lead as a by-product of the process. This purification of the lead nitrate is, however, only required if crude pig-lead has been used to form the lead oxid, and in that case the cost of refining the lead is saved at the same time that a valuable by-product is obtained; but it is of course to be understood that although for economical reasons crude lead would generally be used the process is not limited in this respect, as it will be obvious that oxid made from refined lead might be used, although with less advantage. The solution of pure lead nitrate produced as above described is added to a solution of sodium carbonate, the carbonate being preferably about twenty per cent. in excess of the theoretical equivalent required to form normal carbonate of lead, the purpose of this excess being to prevent the formation of basic nitrate of lead and to give the requisite basicity to the carbonate of lead.

The best mode of proceeding is to take solutions of lead nitrate and of sodium carbonate (each being of about the strength of a cold saturated solution) in the proportional quantities above mentioned, so that the carbonate will be in excess, and to heat them nearly to boiling-point and then to run the lead solution into the alkali solution, keeping the mixture thoroughly agitated meanwhile and while continuing to boil it for a sufficient time to insure complete decomposition, whereby basic carbonate of lead is precipitated, leaving in solution nitrate of soda and undecomposed carbonate of soda corresponding to the excess employed. This solution of nitrate of soda and carbonate of soda after being separated from the precipitate by decantation or filtration (or by both means) and subsequent washing is then to be boiled down to dryness, the carbonate of soda either being separated by crystallization or left in admixture with the nitrate.

We are aware that it has been proposed to produce basic carbonate of lead by a process which differs from the foregoing mainly in the fact that caustic soda was added, along with carbonate of soda, for imparting basicity to the lead carbonate obtained by precipitation from a solution of lead nitrate; but we have found that the presence of caustic soda at this stage is prejudicial to the operation and that the desired result can be best obtained by using carbonate of soda alone and in excess, as above described, so as to prevent the formation of basic nitrate of lead and impart the desired basicity to the carbonate of lead.

We claim—

The herein-described process of producing basic lead carbonate which consists in forming a solution of lead nitrate and a solution of sodium carbonate twenty per cent. in excess of the theoretical equivalent required to act upon the said solution of lead nitrate to form normal carbonate of lead and mixing the said two solutions and boiling and agitating the same, whereby the lead nitrate will be decomposed and a precipitate of basic lead carbonate will result together with carbonate of soda and sodium nitrate and thereupon separating the precipitate from the solution.

OSCAR JULIAN STEINHART.
JULIUS LEONARD FOX VOGEL.

In presence of—
WALTER J. SKERTEN,
W. M. HARRIS.